United States Patent [19]

Mitani et al.

[11] Patent Number: 5,932,145
[45] Date of Patent: Aug. 3, 1999

[54] ADDITION REACTION-CURING ELECTRICALLY CONDUCTIVE SILICONE COMPOSITION AND METHOD FOR THE PREPARATION THEREOF

[75] Inventors: Osamu Mitani; Kazumi Nakayoshi; Rikako Tazawa; Katsutoshi Mine, all of Chiba Prefecture, Japan

[73] Assignee: Dow Corning Toray Silicone Co., Ltd., Tokyo, Japan

[21] Appl. No.: 08/960,645

[22] Filed: Oct. 30, 1997

[30] Foreign Application Priority Data

Oct. 31, 1996 [JP] Japan ................................. 8-305670

[51] Int. Cl.[6] ...................................................... H01B 1/06
[52] U.S. Cl. ........................... 252/511; 252/514; 524/439; 524/440
[58] Field of Search ..................................... 252/511, 514; 524/439, 440

[56] References Cited

U.S. PATENT DOCUMENTS

| 4,545,914 | 10/1985 | Graiver | 523/137 |
|---|---|---|---|
| 4,547,312 | 10/1985 | Graiver | 523/137 |
| 4,777,205 | 10/1988 | La Scola | 524/440 |
| 4,904,414 | 2/1990 | Peltz | 524/439 |
| 5,021,494 | 6/1991 | Toya | 524/424 |
| 5,173,765 | 12/1992 | Nakayoshi | 528/15 |
| 5,221,575 | 6/1993 | Nakano | 428/323 |
| 5,294,373 | 3/1994 | Takahashi | 252/502 |
| 5,384,075 | 1/1995 | Okami | 524/266 |
| 5,447,661 | 9/1995 | Takahashi | 528/10 |
| 5,717,009 | 2/1998 | Matsushita | 523/213 |

FOREIGN PATENT DOCUMENTS 87-228767  4/1987  Japan .

*Primary Examiner*—Paul R. Michl
*Attorney, Agent, or Firm*—Sharon K. Severance

[57] ABSTRACT

An addition reaction-curing conductive silicone composition comprises: an organopolysiloxane with alkenyl groups, an organopolysiloxane with silicon-bonded hydrogen atoms, a conductive microparticulate, a platinum catalyst, and a volatile solvent; and the composition cures to yield a conductive cured silicone product that has low resistance and resistivity values, a resistance value independent of temperature, and little variation in resistance and resistivity values over time.

13 Claims, No Drawings

ADDITION REACTION-CURING ELECTRICALLY CONDUCTIVE SILICONE COMPOSITION AND METHOD FOR THE PREPARATION THEREOF

BACKGROUND OF THE INVENTION

This invention relates to an addition reaction-curing electrically conductive silicone composition and to a method for the preparation of an electrically conductive cured silicone. More particularly, this invention relates to an addition reaction-curing electrically conductive silicone composition that cures to a silicone with the desirable properties of low electrical resistance and resistivity, electrical resistance independent of temperature, and little variation in electrical resistance and resistivity over time. The invention also relates to an efficient method for fabricating the electrically conductive cured silicone.

Electrically conductive silicone compositions that cure by addition reaction to give electrically conductive cured silicones are known (below, "electrically conductive" is abbreviated simply as "conductive"). Examples include the conductive silicone rubber compositions disclosed in JP-A-3-170581 and JP-A 7-133432. These compositions comprise organopolysiloxanes having at least 2 alkenyl groups per molecule, organopolysiloxanes having at least 2 silicon-bonded hydrogen atoms per molecule, silver micropowder, and platinum addition-reaction catalyst.

The conductive cured silicones afforded by these compositions suffer from problems such as high resistance and resistivity values, resistance dependent on temperature, and large variation in resistance and resistivity values over time. Although the cured products may have low resistance at room temperature immediately after cure, higher temperatures can cause the resistance to increase, and the passage of time can cause the resistance and resistivity values to rise.

One method for coping with these problems consists of increasing the amount of the metal micropowder in the composition, but this increases viscosity of the composition substantially, and hence, strongly impairs the handling characteristics. Another method for addressing the problems consists of increasing the addition of the metal micropowder to the composition while admixing a large amount of a volatile solvent to reduce viscosity and improve handling characteristics. However, the resulting composition, cured silicone, or both, may not be homogeneous, and the cured silicone will not inevitably have low resistance and resistivity values. Moreover, this method cannot give a cured silicone with small variation in resistance and resistivity over time.

However, cured silicone with the desirable properties can be obtained by blending a small amount of a special volatile solvent into an addition reaction-curing conductive silicone composition and effecting volumetric shrinkage of its cured product by removing the volatile solvent during or after curing. (The desirable properties are low resistance and resistivity values, resistance independent of temperature, and low variation by the resistance and resistivity values over time). Moreover, the desirable properties are obtained without having to increase the amount of metal micropowder in the composition and without having to blend large amounts of volatile solvent into the composition.

One object of this invention is to provide an addition reaction-curing conductive silicone composition that cures to give a conductive cured silicone with the desirable properties discussed above. An additional object of the invention is to provide a highly efficient method for fabricating the conductive cured silicone.

SUMMARY OF THE INVENTION

An addition reaction-curing electrically conductive silicone composition comprises:

(A) 100 weight parts of an organopolysiloxane with at least 2 alkenyl groups per molecule;

(B) a quantity sufficient to cure the composition of an organopolysiloxane with at least 2 silicon-bonded hydrogen atoms per molecule;

(C) 50 to 2,000 weight parts, per 100 weight parts of component (A), of an electrically conductive microparticulate;

(D) a catalytic quantity of a platinum addition-reaction catalyst; and (E) 0.1 to 10 weight parts, per 100 weight parts of a combination of components (A), (B), (C), and (D), of a volatile solvent with a boiling point greater than that temperature which is required to cure the combination of components (A), (B), (C), and (D), and less than or equal to 400° C.

A method for preparing conductive cured silicone is characterized by removing component (E) during or after the cure of the aforesaid composition.

DETAILED DESCRIPTION OF THE INVENTION

An addition reaction-curing electrically conductive silicone composition comprises:

(A) 100 weight parts of an organopolysiloxane with at least 2 alkenyl groups per molecule;

(B) a quantity sufficient to cure the composition of an organopolysiloxane with at least 2 silicon-bonded hydrogen atoms per molecule;

(C) 50 to 2,000 weight parts, per 100 weight parts of component (A), of an electrically conductive microparticulate;

(D) a catalytic quantity of a platinum addition-reaction catalyst; and (E) 0.1 to 10 weight parts, per 100 weight parts of a combination of components (A), (B), (C), and (D), of a volatile solvent with a boiling point greater than that temperature which is required to cure the combination of components (A), (B), (C), and (D), and less than or equal to 400° C.

Component (A) is an organopolysiloxane with at least 2 alkenyl groups per molecule. The alkenyl in component (A) is exemplified by vinyl, allyl, butenyl, pentenyl, hexenyl, and heptenyl, with vinyl being particularly preferred. The alkenyl can be bonded at the molecular chain terminals, in pendant positions on the molecular chain, or both. Other silicon-bonded organic groups in component (A) are exemplified by substituted and unsubstituted monovalent hydrocarbon groups, e.g., alkyl such as methyl, ethyl, propyl, butyl, pentyl, and hexyl; aryl such as phenyl, tolyl, and xylyl; aralkyl such as benzyl and phenethyl; and halogenated alkyl such as 3-chloropropyl and 3,3,3-trifluoropropyl. Methyl and phenyl are specifically preferred.

Component (A) can have straight-chain, partially branched straight-chain, branched-chain, or network molecular structure, or may be a mixture of two or more selections from organopolysiloxanes with the exemplified molecular structures. Component (A) preferably has a viscosity at 25° C. in the range from 50 to 500,000 mPa.s and more preferably in the range from 300 to 10,000 mPa.s.

Organopolysiloxane (A) is exemplified by trimethylsiloxy-endblocked dimethylsiloxane-methylvinylsiloxane copolymers; trimethylsiloxy-endblocked methylvinylpolysiloxanes; trimethylsiloxy-endblocked methylvinylsiloxane-methylphenylsiloxane copolymers; trimethylsiloxy-endblocked dimethylsiloxane-methylvinylsiloxane-methylphenylsiloxane copolymers; dimethylvinylsiloxy-endblocked dimethylpolysiloxanes; dimethylvinylsiloxy-endblocked methylvinylpolysiloxanes; dimethylvinylsiloxy-endblocked methylphenylpolysiloxanes; dimethylvinylsiloxy-endblocked dimethylsiloxane-methylvinylsiloxane copolymers; dimethylvinylsiloxy-endblocked dimethylsiloxane-methylphenylsiloxane copolymers; dimethylvinylsiloxy-endblocked dimethylsiloxane-diphenylsiloxane copolymers; organopolysiloxane comprising the $R_3SiO_{1/2}$ and $SiO_{4/2}$ units; organopolysiloxane comprising the $RSiO_{3/2}$ unit; organopolysiloxane comprising the $R_2SiO_{2/2}$ and $RSiO_{3/2}$ units; organopolysiloxane comprising the $R_2SiO_{2/2}$, $RSiO_{3/2}$, and $SiO_{4/2}$ units; and mixtures of two or more of the preceding organopolysiloxanes. R represents substituted and unsubstituted monovalent hydrocarbon groups. R is exemplified by alkyl such as methyl, ethyl, propyl, butyl, pentyl, octyl, and so forth; alkenyl such as vinyl, allyl, butenyl, pentenyl, hexenyl, and so forth; aryl such as phenyl, tolyl, xylyl, and so forth; aralkyl such as benzyl, phenethyl, and so forth; and halogenated alkyl such as 3-chloropropyl, 3,3,3-trifluoropropyl, and so forth, with the proviso that at least 2 of the R per molecule must be alkenyl.

Component (B), which is a curing agent for the composition, is an organopolysiloxane that contains at least 2 silicon-bonded hydrogen atoms per molecule. The hydrogen can be bonded at the molecular chain terminals, in pendant positions on the molecular chain, or both. Other silicon-bonded groups in (B) are organic groups exemplified by non-alkenyl, substituted and unsubstituted, monovalent hydrocarbon groups; for example, alkyl such as methyl, ethyl, propyl, butyl, pentyl, hexyl, and so forth; aryl such as phenyl, tolyl, xylyl, and so forth; aralkyl such as benzyl, phenethyl, and so forth; and halogenated alkyl such as 3-chloropropyl, 3,3,3-trifluoropropyl, and so forth. Methyl and phenyl are specifically preferred here.

Component (b) can have straight-chain, partially branched straight-chain, branched-chain, cyclic, or network molecular structure, or may be a mixture of two or more selections from organopolysiloxanes with the exemplified molecular structures. Component (B) preferably has a viscosity at 25° C. in the range from 1 to 50,000 mPa.s and more preferably in the range from 5 to 1,000 mPa.s.

Organopolysiloxane (B) is exemplified by trimethylsiloxy-endblocked methylhydrogenpolysiloxanes; trimethylsiloxy-endblocked dimethylsiloxane-methylhydrogensiloxane copolymers; trimethylsiloxy-endblocked methylhydrogensiloxane-methylphenylsiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked methylhydrogenpolysiloxanes; dimethylhydrogensiloxy-endblocked dimethylsiloxane-methylhydrogensiloxane copolymers; dimethylhydrogensiloxy-endblocked dimethylsiloxane-methylphenylsiloxane copolymers; and dimethylhydrogensiloxy-endblocked methylphenylpolysiloxanes.

Component (B) is added in an amount sufficient to cure the composition. Component (B) is preferably added in a quantity that provides from 0.5 to 10 silicon-bonded hydrogen atoms in component (B) per alkenyl group in component (A). A progressively unsatisfactory cure results when the number of silicon-bonded hydrogen in (B) declines below 0.5 per alkenyl group in component (A). When the number of silicon-bonded hydrogen atoms per alkenyl group exceeds 10, foam is produced during cure, heat resistance of the resulting cured silicone progressively declines, or both.

Component (C) is a microparticulate conductive metal that creates electrical conductivity in the conductive cured silicone. Component (C) is exemplified by micropowders of gold, silver, nickel, copper, and the like; and by the micropowders fabricated by the vacuum deposition, or plating, of a metal such as gold, silver, nickel, copper, etc., onto the surface of a ceramic, glass, quartz, or organic resin micropowder, and the like. To obtain a highly conductive cured silicone with a volume resistivity $\leq 0.1$ $\Omega$.cm, component (C) in the instant composition is preferably gold micropowder or silver micropowder. At practical level silver micropowder is preferable. The shape of the silver micropowder can be spherical, flake, or dendritic flake. Flake and dendritic flake are preferred for the preparation of highly conductive cured silicones with a volume resistivity $\leq 1 \times 10^{-3}$ $\Omega$.cm. The average particle size of component (C) is preferably, for example, 1 to 10 micrometers.

Component (C) is added at 50 to 2,000 weight parts per 100 weight parts component (A) and preferably at 300 to 1,000 weight parts per 100 weight parts component (A). The cured silicone exhibits a progressively unsatisfactory conductivity when the addition of component (C) to the composition falls below the lower limit of the specified range. When the addition of component (C) exceeds the upper limit of the range, the composition exhibits progressively poorer handling characteristics.

Component (D) is a platinum addition-reaction catalyst whose function is to accelerate the cure of the present composition. Platinum and platinum compounds known as hydrosilylation-reaction catalysts can be used as component (D). Component (D) is exemplified by platinum black, platinum-on-alumina powder, platinum-on-silica powder, platinum-on-carbon powder, chloroplatinic acid, alcohol solutions of chloroplatinic acid, platinum-olefin complexes, platinum-alkenylsiloxane complexes, and the catlysts afforded by the microparticulation of the dispersion of a platinum addition-reaction catalyst, as described above, in a thermoplastic resin such as methyl methacrylate, polycarbonate, polystyrene, silicone, etc. (abbreviated below as thermoplstic resin-dispersed platinum catalyst micropowder).

A quantity of component (D) sufficient to cure the present composition is added. Component (D) can be added at from 0.1 to 1,000 weight-ppm as platinum metal in component (D) based on the combined amounts of components (A) and (B).

Component (E) is a volatile solvent the purpose of which is to induce volumetric shrinkage of the silicone, and thereby lower the resistance and resistivity values of the cured silicone, reduce the dependence of the resistance value on temperature, and reduce the timewise variations in the resistance and resistivity values. Component (E) can be any volatile solvent with a boiling point $\leq 400°$ C., as long as the boiling point is higher than the curing temperature of the composition. The boiling point is preferably from 20° C. to 400° C., more preferably from 100° C. to 400° C., and particularly preferably from 150° C. to 400° C. Additionally, component (E) should not participate in or inhibit the curing reaction, i.e., the addition reaction, of the composition.

Component (E) is exemplified by aromatic hydrocarbon compounds such as o-xylene (bp=144° C.), m-xylene (bp= 139° C.), p-xylene (bp=138° C.), 1,2,4-trimethylbenzene (bp=170° C.), 1,3,5-trimethylbenzene (bp=165° C.), 1,2,4,5-tetramethylbenzene (bp=192° C.), n-dodecylbenzene (bp=331° C.), and cyclohexylbenzene (bp=237° C.); chain and cyclic aliphatic hydrocarbon compounds such as n-decane (bp=174° C.), isodecane (bp=180° C.), n-undecane (bp=195° C.), n-dodecane (bp=216° C.), n-tridecane (bp=235° C.), n-tetradecane (bp=253° C.), and cyclooctane (bp=149° C.), and also the paraffinic mixed solvents and isoparaffinic mixed solvents with boiling points≦400° C. that are mixtures of the above-listed aliphatic hydrocarbons; ester compounds such as ethyl benzoate (bp=212° C.) and diethyl phthalate (bp=296° C.); ether compounds such as dibutyl ether (bp=143° C.), anisole (bp=155° C.), and phenetole (bp=170° C.); organosilicon compounds such as tetramethoxysilane (bp=121° C.), tetraethoxysilane (bp=169° C.), methyltrimethoxysilane (bp=103° C.), methyltriethoxysilane (bp=143° C.), phenyltrimethylsilane (bp=169° C.), 3-glycidoxypropyltrimethoxysilane (bp=290° C.), and 3-methacryloxypropyltrimethoxysilane (bp=255° C.); and mixtures of two or more selections from these volatile solvents. When component (D) is a platinum catalyst dispersed in a thermoplastic resin, a volatile solvent that will not dissolve the thermoplastic resin is preferably selected for component (E).

Component (E) is added in the range from 0.1 to 10 weight parts per 100 weight parts of the combined amount of components (A), (B), (C), and (D). The amount of component (E) is preferably from 0.1 to 7 weight parts, more preferably from 0.1 to 5 weight parts, and particularly preferably from 0.1 up to, but not including, 5 weight parts. The following problems arise, individually or collectively, with the cured silicone when the composition contains less than 0.1 weight part component (E): high resistance and resistivity values, resistance that is dependent on temperature, and large variations in the resistance and resistivity values over time. When the amount of component (E) is greater than 10 weight parts, the composition becomes non-uniform and cures to a silicone with a pronounced tendency to be non-uniform and with progressively higher resistance and resistivity values.

To impart excellent adhesiveness to the cured silicone afforded by the subject composition, optional component (F), an alkoxy-functional organosilicon compound that contains silicon-bonded hydrogen or alkenyl groups can be admixed into the composition. Component (F) is exemplified by vinyltrimethoxysilane, allyltrimethoxysilane, allyltriethoxysilane, and the organosilicon compounds given below.

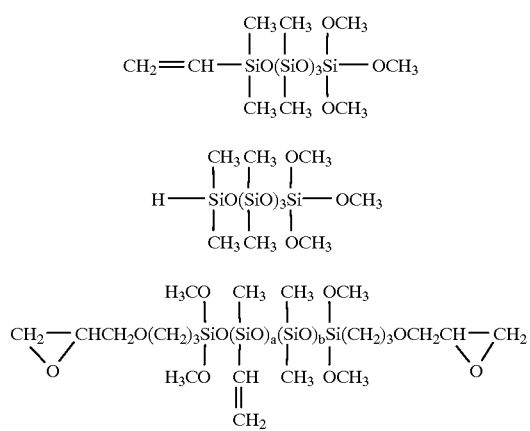

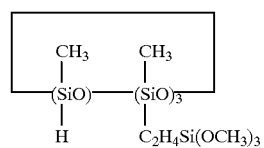

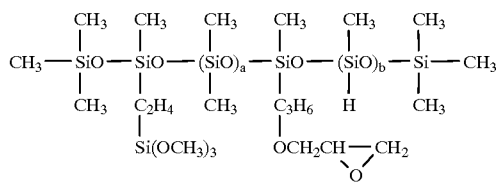

The subscripts a and b in the preceding formulas are positive integers, each with a value of at least 1.

Component (F) is preferably added at up to 20 weight parts, and more preferably at 0.5 to 8 weight parts, per 100 weight parts component (A). Excellent adhesiveness cannot be imparted to the conductive cured silicone when component (F) is not added. Compositions containing more than 20 weight parts of component (F) per 100 weight parts component (A) suffer from problems such as having a low storage stability and giving a cured silicone with durometer that progressively increases with time.

To improve handling characteristics of the composition, optional component (G), an addition-reaction inhibitor, can be added. Component (G) is exemplified by alkyne alcohols such as 3-methyl-1-butyn-3-ol, 3,5-dimethyl-1-hexyn-3-ol, and 3-phenyl-1-butyn-3-ol; ene-yne compounds such as 3-methyl-3-penten-1-yne and 3,5-dimethyl-3-hexen-1-yne; and by 1,3,5,7-tetramethyl-1,3,5,7-tetravinylcyclotetrasiloxane, 1,3,5,7-tetramethyl-1,3,5,7-tetrahexenylcyclotetrasiloxane, benzotrizole, and so forth. Component (G) is preferably added in the range from 0.001 to 5 weight parts, per 100 weight parts component (A).

To provide the composition with suitable durometer and mechanical strength, optional component (H) may be added. Component (H) is exemplified by inorganic fillers such as fumed silica, crystalline silica, calcined silica, wet-process silica, fumed titanium oxide, carbon black, and the like; the preceding inorganic fillers after surface hydrophobicization by treatment with an organosilicon compound such as organoalkoxysilane, organochlorosilane, organodisilazane, and others; pigments; and heat stabilizers. Inorganic filler is preferably added, for example, at up to 50 weight parts, per 100 weight parts component (A).

A method for preparation of an electrically conductive cured silicone comprises the steps of:
1) mixing to homogeneity, a composition comprising:
 (A) 100 weight parts of an organopolysiloxane with at least 2 alkenyl groups per molecule;
 (B) a quantity sufficient to cure the composition of an organopolysiloxane with at least 2 silicon-bonded hydrogen atoms per molecule;
 (C) 50 to 2,000 weight parts, per 100 weight parts of component (A), of an electrically conductive microparticulate;
 (D) a catalytic quantity of a platinum addition-reaction catalyst and
 (E) 0.1 to 10 weight parts, per 100 weight parts of a combination of components (A), (B), (C), and (D), of a volatile solvent with a boiling point greater than that temperature which is required to cure the combination of components (A), (B), (C), and (D), and less than or equal to 400° C.; and 2) removing component (E).

The method for preparing the cured silicone from the composition described above can be by mixing components (A), (B), (C), (D), and (E) to homogeneity. Optional components (F), (G), or (H), or any combination of (F), (G), and (H), may be admixed. Component (E) is removed in step 2), during or after curing the composition. While the complete removal of component (E) is not required, component (E) must be removed to a sufficient degree to give the cured silicone low values for resistance and resistivity, a resistance independent of temperature, and a low variation in resistance and resistivity values over time. However, the complete removal of component (E) from the cured silicone is preferred.

The composition can be cured by holding the composition at room temperature or by heating the composition. When cure is by heating, the composition is heated to a temperature below the boiling point of component (E). Cure is preferably at a temperature that does not cause the complete removal of component (E) during the cure. If the curing temperature is equal to or greater than the boiling point of component (E), component (E) is completely removed prior to completion of the cure. As a result, reduction in resistance and resistivity values of the cured product, reduction of the temperature dependence by the resistance, and reduction in the variation in the resistance and resistivity values over time are unsatisfactory. In extreme cases, voids will be produced in the cured silicone. Therefore, temperatures at least 20° C. below the boiling point of (E) are preferred, temperatures at least 50° C. below the boiling point of (E) are more preferred, and temperatures at least 80° C. below the boiling point of (E) are particularly preferred for curing the composition.

The technique for removing (E) from the conductive cured silicone can be heating the cured silicone at ambient pressure, placing the cured silicone under reduced pressure at ambient temperature, or heating the cured silicone under reduced pressure. Heating at ambient pressure is the preferred technique. When large amounts of component (E) must be removed, the cured silicone is preferably heated in an inert gas atmosphere of argon, helium, nitrogen, etc.

Because the method of the present invention produces highly conductive cured silicones with resistivities $\leq 1$ $\Omega$.cm and preferably $\leq 1 \times 10^{-3}$ $\Omega$.cm, this method can be used to form electrodes between a chip component and circuit substrate, to adhere these components to each other, to adhere a semiconductor element to a circuit substrate or lead frame, to form electrodes, and the like.

EXAMPLES

These examples are intended to illustrate the invention to those skilled in the art and should not be interpreted as limiting the scope of the invention set forth in the claims.

The viscosity values reported in the examples were measured at 25° C. The resistance and resistivity of the conductive cured silicone were measured as follows. The addition reaction-curing conductive silicone composition was defoamed under reduced pressure and applied (width=5 mm and thickness=0.13 mm) to a circuit board bearing electrodes (width=7 mm) at a 35-mm interval so as to connect the electrodes. A circuit was then fabricated by first curing the composition under the reported conditions and then removing the volatile solvent according to the particular case. The resistance of this circuit was measured at 25° C. and 150° C., and the resistivity of this cured product was also measured at 25° C. by the four-point probe method. The circuit was subsequently subjected to a 1000-cycle thermal shock test (1 cycle=−40° C.×30 minutes and 120° C.×30 minutes), after which the resistance was again measured at 25° C. and 150° C. and the resistivity of the cured product was measured by the four-point probe method at 25° C.

Example 1

The following were mixed to homogeneity:

component (A)=61 weight parts dimethylvinylsiloxy-endblocked dimethylpolysiloxane with a viscosity of 500 mPa.s and a vinyl content of 0.43 weight % and 25 weight parts of a mixture of dimethylvinylsiloxy-endblocked dimethylpolysiloxane and organopolysiloxane composed of the $(CH_3)_3SiO_{1/2}$, $(CH_2=CH)(CH_3)_2SiO_{1/2}$, and $SiO_{4/2}$ units, the mixture having vinyl content=0.75 weight % and viscosity=8,000 mPa.s;

component (B)=4 weight parts trimethylsiloxy-endblocked methylhydrogenpolysiloxane with a viscosity of 30 mPa.s and a silicon-bonded hydrogen content of 1.5 weight %;

component (C)=400 weight parts reduced silver microflake with an average particle size of 5 micrometers;

component (D)=catalyst prepared by the microparticulation of a dispersion of a platinum/1,3-divinyl-1,1,3,3-tetramethyldisiloxane complex in thermoplastic silicone resin with a softening point of 80 to 90° C., added in an amount that provided 15 weight-ppm platinum metal in the instant composition;

component (F)=7 weight parts organopolysiloxane with the formula

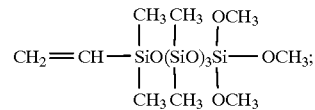

component (G)=200 weight-ppm phenylbutynol; and component (H)=3 weight parts hydrophobic fumed silica. The composition was mixed to homogeneity with isoparaffinic mixed solvent (=component (E), Nisscki Isozole 400 from Nippon Sekiyu Kabushiki Kaisha, bp=200 to 250° C.) at 2 weight parts (E) for each 100 weight parts of the combined amount of components (A), (B), (C), and (D).

This composition was defoamed under reduced pressure, applied between electrodes as described above, and cured by heating for 30 minutes at 120° C. The isoparaffinic mixed solvent in the conductive silicone rubber was then removed by heating the conductive silicone rubber for 30 minutes at 250° C. under a nitrogen current. The resistance of the circuit was measured both initially and after thermal shock cycling, and the resistivity of the conductive silicone rubber was also measured both initially and after thermal shock cycling. The results are reported in Table 1.

Example 2

The conductive silicone rubber composition prepared in Example 1 was applied between electrodes as described above and then cured by heating for 30 minutes at 120° C. The resulting conductive silicone rubber was thereafter heated in air at 150° C. for 1 hour to remove the isoparaffinic mixed solvent in the conductive silicone rubber. The resistance of the circuit was measured both initially and after thermal shock cycling, and the resistivity of the conductive silicone rubber was measured both initially and after thermal shock cycling. The results are reported in Table 1.

Example 3

A conductive silicone rubber composition was prepared as in Example 1, but in this case changing the addition of the isoparaffinic mixed solvent in the conductive silicone rubber composition of Example 1 to 4 weight parts. A circuit was fabricated by curing the composition as in Example 1 and removing the isoparaffinic mixed solvent as in Example 1. The circuit was submitted to measurement of the resistance both initially and after thermal shock cycling, and the conductive silicone rubber was submitted to measurement of the resistivity both initially and after thermal shock cycling. The results are reported in Table 1.

Example 4

The following were mixed to homogeneity:

component (A)=61 weight parts dimethylvinylsiloxy-endblocked dimethylpolysiloxane with a viscosity of 500 mPa.s and a vinyl content of 0.43 weight % and 25 weight parts of a mixture of dimethylvinylsiloxy-endblocked dimethylpolysiloxane and organopolysiloxane composed of the $(CH_3)_3SiO_{1/2}$, $(CH_2=CH)(CH_3)_2SiO_{1/2}$, and $SiO_{4/2}$ units, the mixture having vinyl content=0.75 weight % and viscosity=8,000 mPa.s;

component (B)=4 weight parts trimethylsiloxy-endblocked methylhydrogenpolysiloxane with a viscosity of 30 mPa.s and a silicon-bonded hydrogen content of 1.5 weight %;

component (C)=400 weight parts reduced silver microflake with an average particle size of 5 micrometers;

component (D)=platinum/1,3-divinyl-1,1,3,3-tetramethyldisiloxane complex, added in an amount that provided 10 weight-ppm platinum metal from the catalyst in the instant composition;

component (F)=7 weight parts organopolysiloxane with the formula

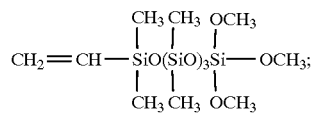

component (G)=800 weight-ppm phenylbutynol; and component (H)=3 weight parts hydrophobic fumed silica in the subject composition. The resulting composition was mixed to homogeneity with cyclohexylbenzene (=component (E), bp=237° C.) at 2 weight parts (E) for each 100 weight parts of the combined amount of components (A), (B), (C), and (D).

The circuit was fabricated by first curing the composition and then removing the cyclohexylbenzene according to the method described in Example 1. the circuit was submitted to measurement of the resistance both initially and after thermal shock cycling, and the conductive silicone rubber was submitted to measurement of the resistivity both initially and after thermal shock cycling. The results are reported in Table 1.

Comparative Example 1

An addition reaction-curing conductive silicone rubber composition was prepared as in Example 1, but in this case without adding the isoparaffinic mixed solvent. Circuit fabrication was carried out by curing the composition as in Example 1. The circuit was submitted to measurement of the resistance both initially and after thermal shock cycling, and the conductive silicone rubber was submitted to measurement of the resistivity both initially and after thermal shock cycling. The results are reported in Table 1.

Comparative Example 2

An addition reaction-curing conductive silicone rubber composition was prepared as in Example 1, but in this case adding the isoparaffinic mixed solvent to the addition reaction-curing conductive silicone rubber composition of Example 1 at 15 weight parts for each 100 weight parts of the combined amount of components (A), (B), (C), and (D). While a barely uniform composition could be prepared, the circuit fabricated by curing the composition as in Example 1 and removing the isoparaffinic mixed solvent as in Example 1 suffered from phase separation by the microparticulate silver and thus was not uniform. The initial resistance of this circuit was measured, and this result is reported in Table 1.

Comparative Example 3 an addition reaction-curing conductive silicone rubber composition was prepared as in Example 1, but in this case adding the isoparaffinic mixed solvent to the addition reaction-curing conductive silicone rubber composition of Example 1 at the rate of 30 weight parts for each 100 weight parts of the combined amount of components (A), (B), (C), and (D). In this case the composition immediately underwent phase separation and was not uniform. The circuit fabricated by curing the composition as in Example 1 and removing the isoparaffinic mixed solvent as in Example 1 suffered from phase separation by the microparticulate silver and thus was not uniform. The initial resistance of this circuit was measured, and this result is reported in Table 1.

TABLE 1

|  | working examples of the invention | | | | comparative examples | | |
| --- | --- | --- | --- | --- | --- | --- | --- |
|  | Example 1 | Example 2 | Example 3 | Example 4 | Comp. Example 1 | Comp. Example 2 | Comp. Example 3 |
| resistance (Ω) | | | | | | | |
| initial 25° C. | 0.52 | 0.54 | 0.53 | 0.54 | 2.80 | >10⁶ NM | >10⁶ NM |

TABLE 1-continued

|  | working examples of the invention | | | | comparative examples | | |
| --- | --- | --- | --- | --- | --- | --- | --- |
|  | | | | | Comp. | Comp. | Comp. |
|  | Example 1 | Example 2 | Example 3 | Example 4 | Example 1 | Example 2 | Example 3 |
| 150° C. | 0.84 | 0.86 | 0.85 | 0.86 | 10 | >$10^6$ NM | >$10^6$ NM |
| after thermal shock cycling | | | | | | | |
| 25° C | 0.53 | 0.56 | 0.55 | 0.56 | >$10^2$ | — | — |
| 150° C. | 0.86 | 0.88 | 0.87 | 0.88 | >$10^4$ | — | — |
| resistivity (Ω · cm) | | | | | | | |
| initial | $4.1 \times 10^{-4}$ | $4.5 \times 10^{-4}$ | $4.3 \times 10^{-4}$ | $4.5 \times 10^{-4}$ | $4.6 \times 10^{-3}$ | — | — |
| after thermal shock cycling | $4.3 \times 10^{-4}$ | $4.8 \times 10^{-4}$ | $4.6 \times 10^{-4}$ | $4.8 \times 10^{-4}$ | >$10^{-1}$ | — | — | abbreviation used: NM = not measurable

We claim:

1. A method for preparation of an electrically conductive cured silicone comprising the steps of:

1) mixing to homogeneity, a composition comprising:
   (A) 100 weight parts of an organopolysiloxane with silicon bonded organic groups, wherein the organic groups are selected from the group consisting of substituted and unsubstituted monovalent hydrocarbon groups, with the proviso that at least 2 of the organic groups per molecule are alkenyl groups;
   (B) a quantity sufficient to cure the composition of an organopolysiloxane with silicon-bonded organic groups and at least 2 silicon-bonded hydrogen atoms per molecule, wherein the silicon bonded organic groups are non-alkenyl groups;
   (C) 50 to 2,000 weight parts, per 100 weight parts of component (A), of an electrically conductive microparticulate;
   (D) a catalytic quantity of a platinum addition-reaction catalyst dispersed in a thermoplastic resin; and
   (E) 0.1 to 10 weight parts, per 100 weight parts of a combination of components (A), (B), (C), and (D), of a volatile solvent selected from the group consisting of aromatic hydrocarbon compounds, chain and cyclic aliphatic hydrocarbon compounds, paraffinic mixed solvents, isoparaffinic mixed solvents, organosilicon compounds, and mixtures of two or more selections from the volatile solvents; and 2) curing the composition; and 3) removing component (E) during or after step 2).

2. The method of claim 1, wherein curing is performed by heating the composition to a temperature at least 20° C. below the boiling point of component (E).

3. The method of claim 2, wherein component (E) is removed after curing the composition by heating the product of step 2) at ambient pressure.

4. The method of claim 3, wherein curing is performed by heating the composition to a temperature 80° C. below the boiling point of component (E).

5. The method of claim 1, wherein component (E) is a solvent selected from the group consisting of paraffinc mixed solvents and isoparaffinic mixed solvents.

6. The method of claim 1, wherein the composition in step 1) further comprises component (F), an alkoxy-functional organosilicon compound that contains functional groups selected from the group consisting of silicon bonded-hydrogen atoms and silicon-bonded alkenyl groups.

7. The method of claim 6, wherein component (F) is present in an amount of 0.5 to 8 parts by weight based on 100 parts by weight of component (A).

8. The method of claim 1, wherein the composition in step 1) further comprises component (G), an inhibitor.

9. The method of claim 8, wherein component (G) is selected from the group consisting of alkyne alcohols and benzotriazole.

10. The method of claim 8, wherein component (G) is present in an amount of 0.001 to 5 parts by weight based on 100 parts by weight of component (A).

11. The method of claim 1, wherein the composition in step 1) further comprises component (H), a material selected from the group consisting of inorganic fillers, inorganic fillers surface treated with an organosilicon compound, pigments, and heat stabilizers.

12. The method of claim 11, wherein component (H) is an inorganic filler present in the composition in an amount of up to 50 weight parts based on 100 weight parts of component (A).

13. The method of claim 5, wherein component (E) is removed after curing the composition by heating the product of step 2) at ambient pressure.

* * * * *